(12) United States Patent
Heinrich

(10) Patent No.: US 6,967,047 B2
(45) Date of Patent: Nov. 22, 2005

(54) COMPOSITE ARTICLE WITH HIGHLY FILLED PLASTIC COMPONENT

(75) Inventor: Alfred Heinrich, Bergisch Gladbach (DE)

(73) Assignee: Max Baermann GmbH, Bergisch Gladbach (DE)

( * ) Notice: Subject to any disclaimer, the term of this patent is extended or adjusted under 35 U.S.C. 154(b) by 412 days.

(21) Appl. No.: 09/777,866

(22) Filed: Feb. 7, 2001

(65) Prior Publication Data

US 2001/0020882 A1 Sep. 13, 2001

(30) Foreign Application Priority Data

Feb. 9, 2000 (DE) .......................... 200 02 277 U

(51) Int. Cl.$^7$ ................................ B32B 3/02
(52) U.S. Cl. ..................... 428/64.1; 277/317; 277/321; 428/66.2; 428/66.3; 428/66.4; 428/66.7; 428/119; 428/120; 428/138; 428/192; 428/328; 428/900
(58) Field of Search ............................ 428/64.1, 66.2, 428/66.3, 66.4, 66.7, 900, 119, 120, 138, 428/192, 328; 277/321, 317, 80

(56) References Cited

U.S. PATENT DOCUMENTS

| 2,735,232 A | * | 2/1956 | Simjian ....................... 451/113 |
| 2,810,239 A | * | 10/1957 | Burleigh ...................... 451/342 |
| 5,530,344 A | * | 6/1996 | Caillaut et al. ............. 324/174 |
| 5,888,600 A | | 3/1999 | Wycech ..................... 428/35.9 |
| 6,259,343 B1 | | 7/2001 | Schwarz |

FOREIGN PATENT DOCUMENTS

EP 0 647 851 A1 10/1994

* cited by examiner

Primary Examiner—Nasser Ahmad
(74) Attorney, Agent, or Firm—Nixon & Vanderhye, P.C.

(57) ABSTRACT

Composite articles having a highly filled plastic component connected to a basic body are provided which avoid the occurrence of cracks in the plastic component under changing thermal conditions. More specifically, the plastic component is not fixed directly to the basic body but instead is fixed indirectly thereto via at least one intermediary component made of an elastic material. Preferably, the intermediary component is embedded by a frictional and/or positive connection with at least one projection in a groove or opening (28) of the plastic component.

21 Claims, 8 Drawing Sheets

Figure 9:
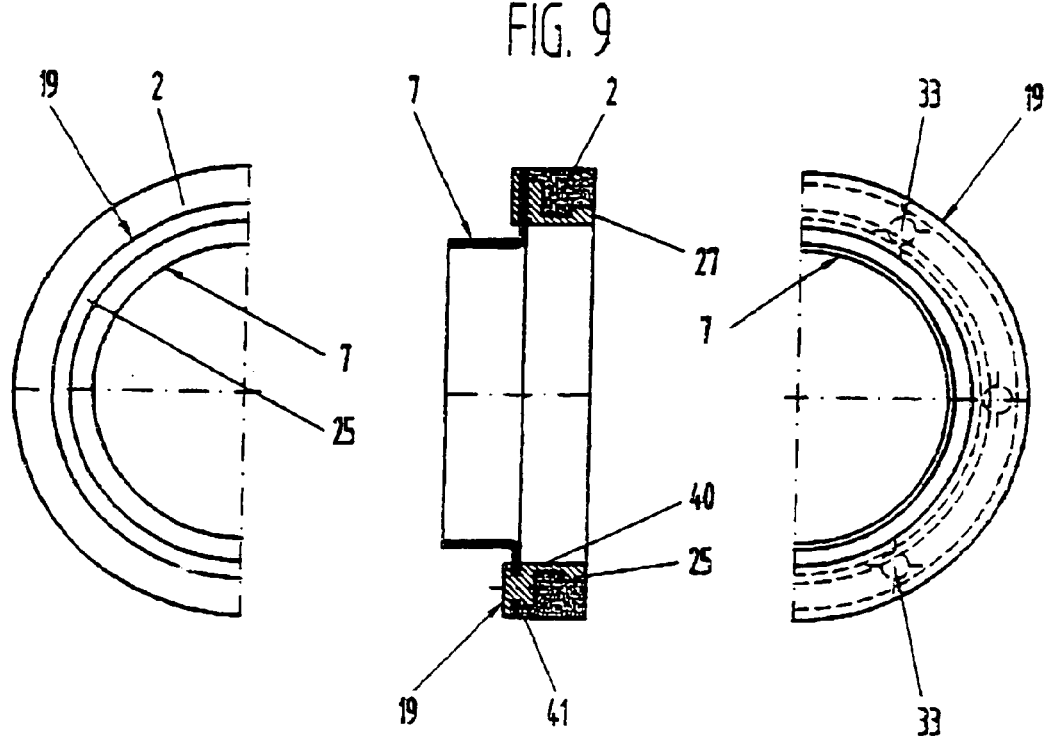

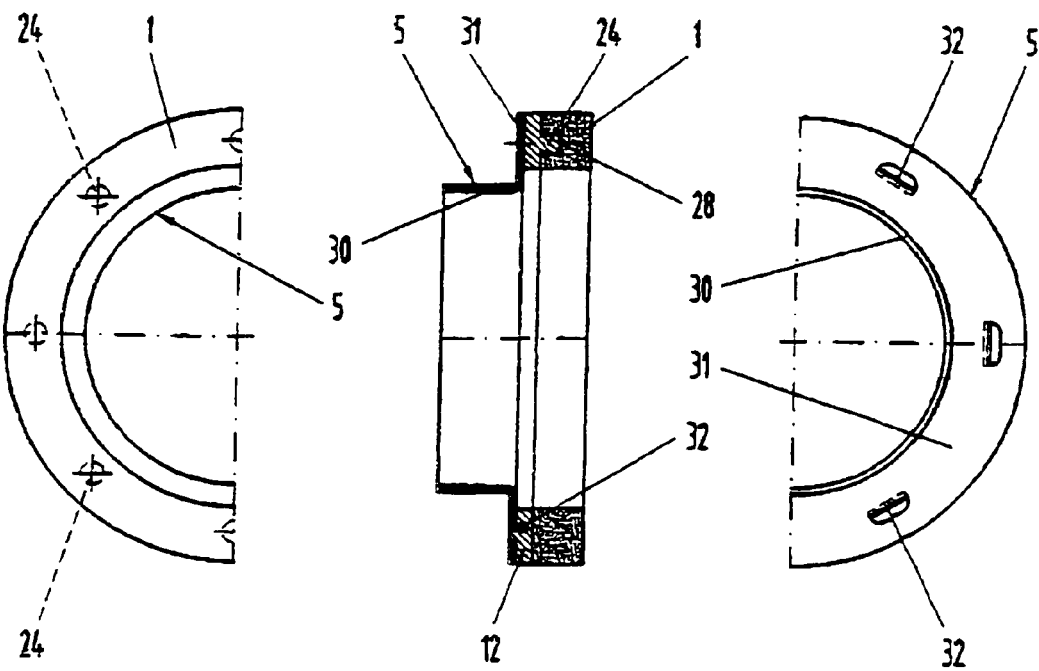
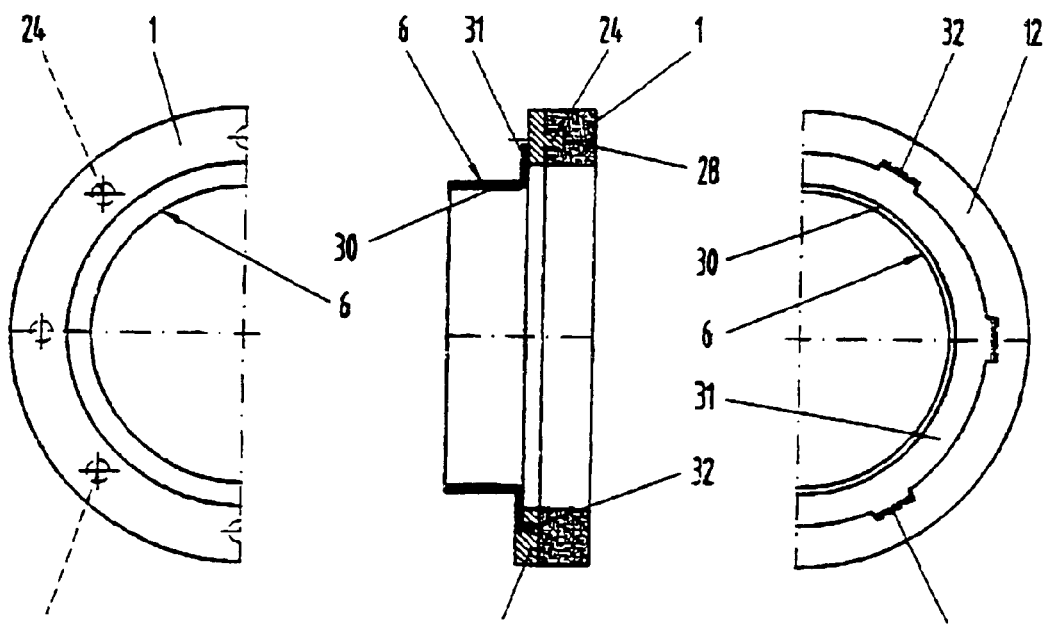

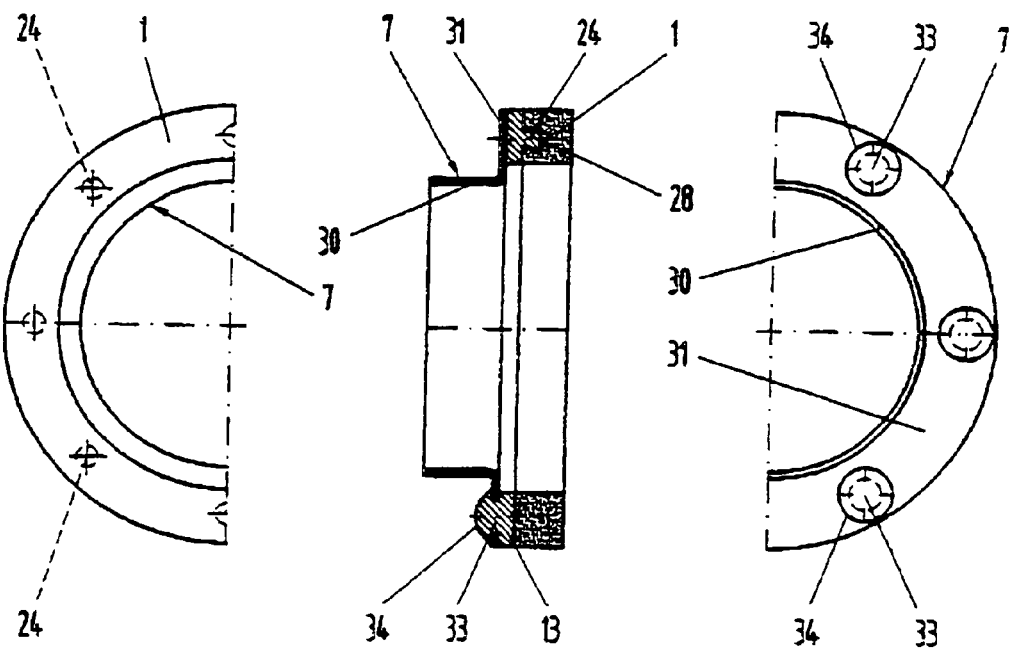
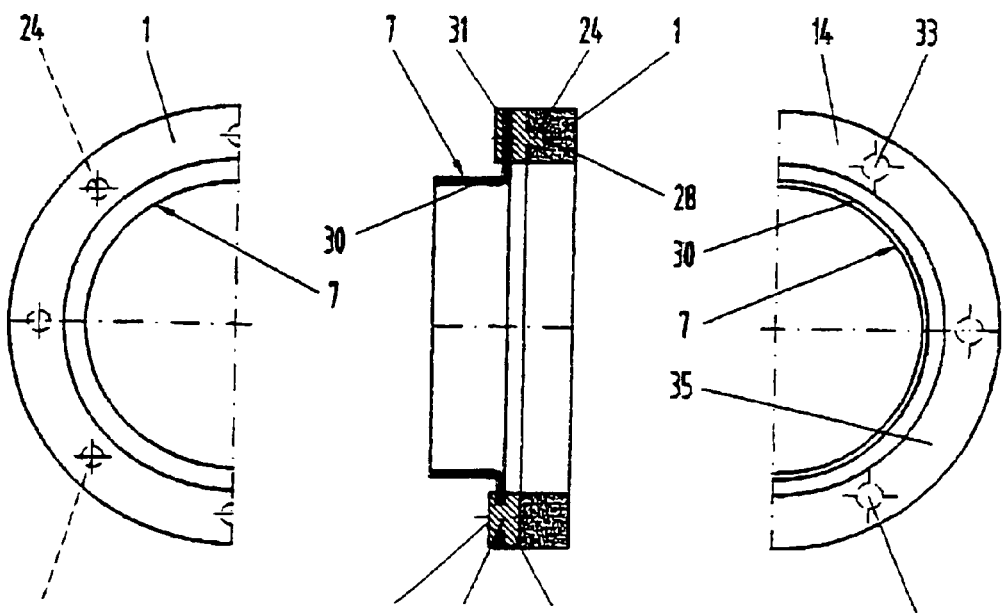

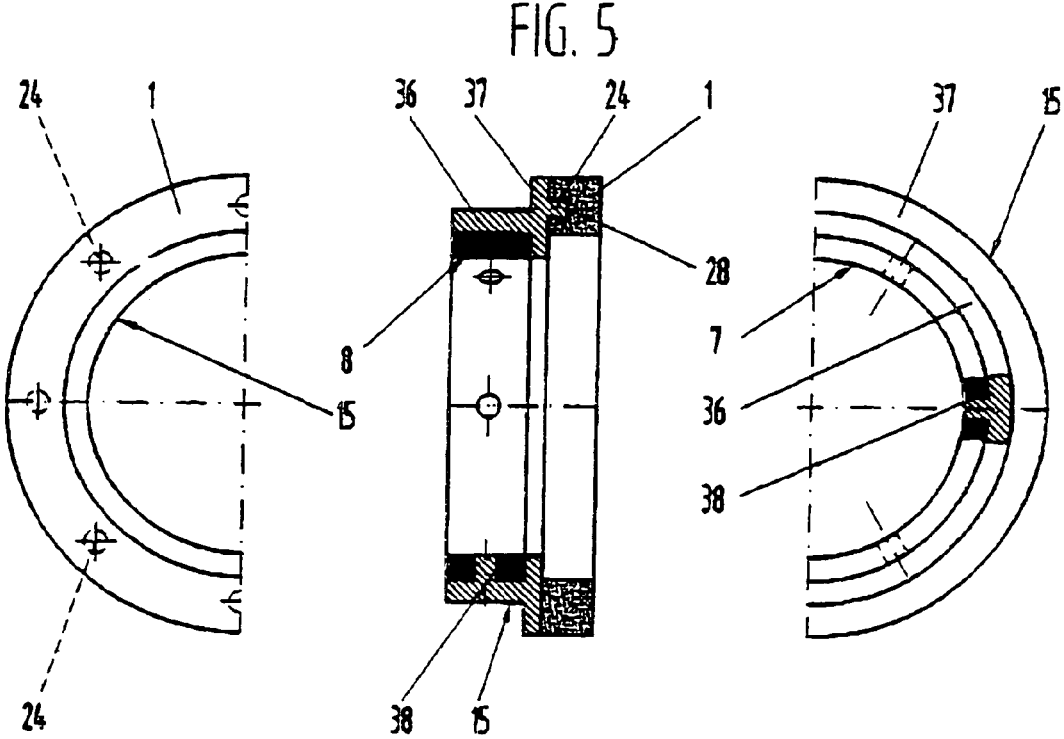
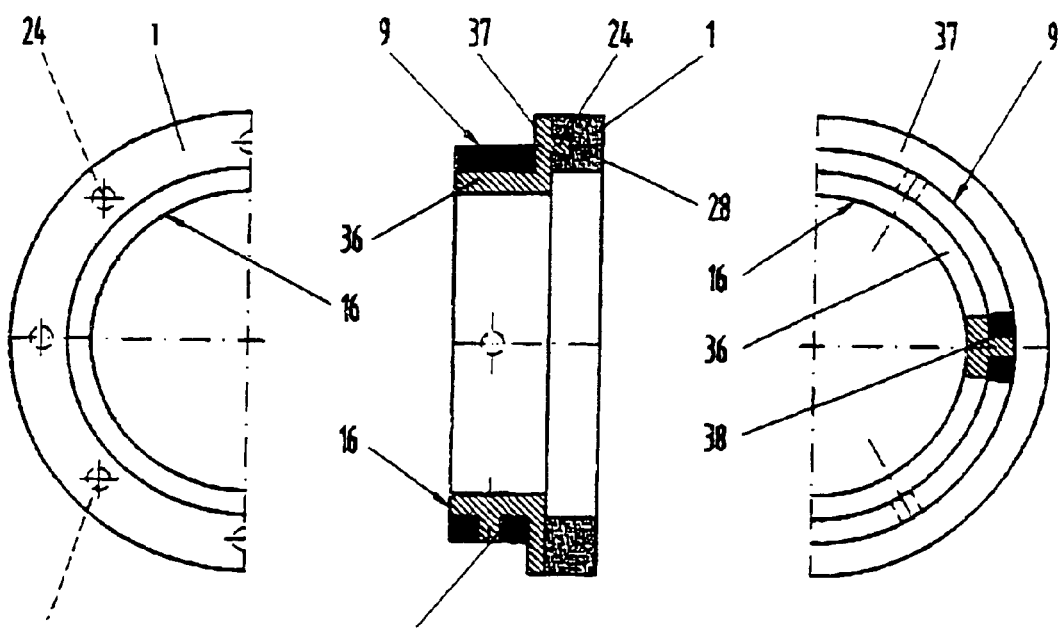

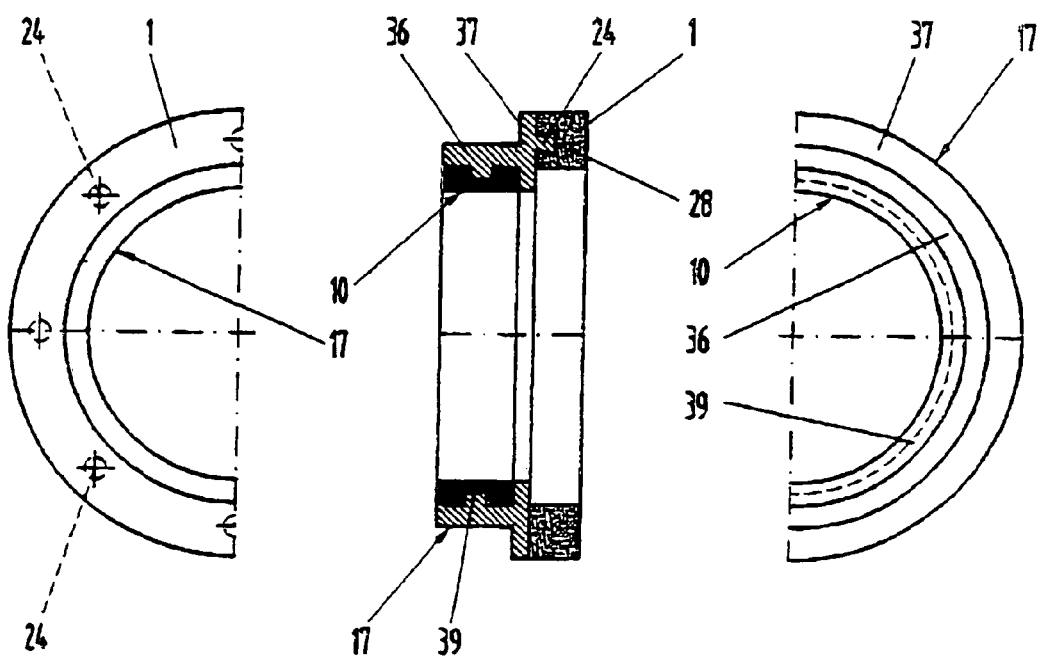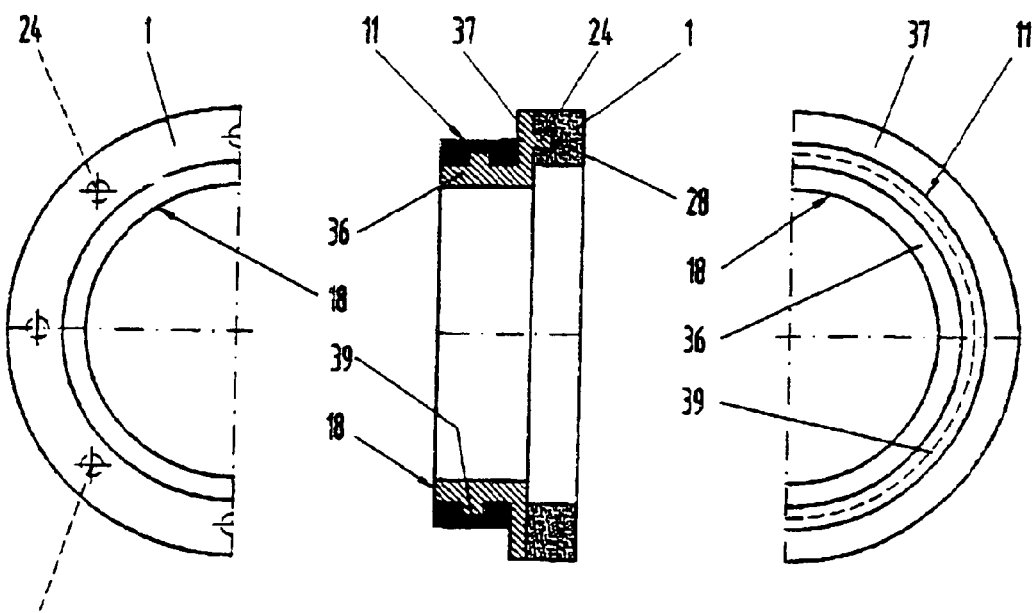

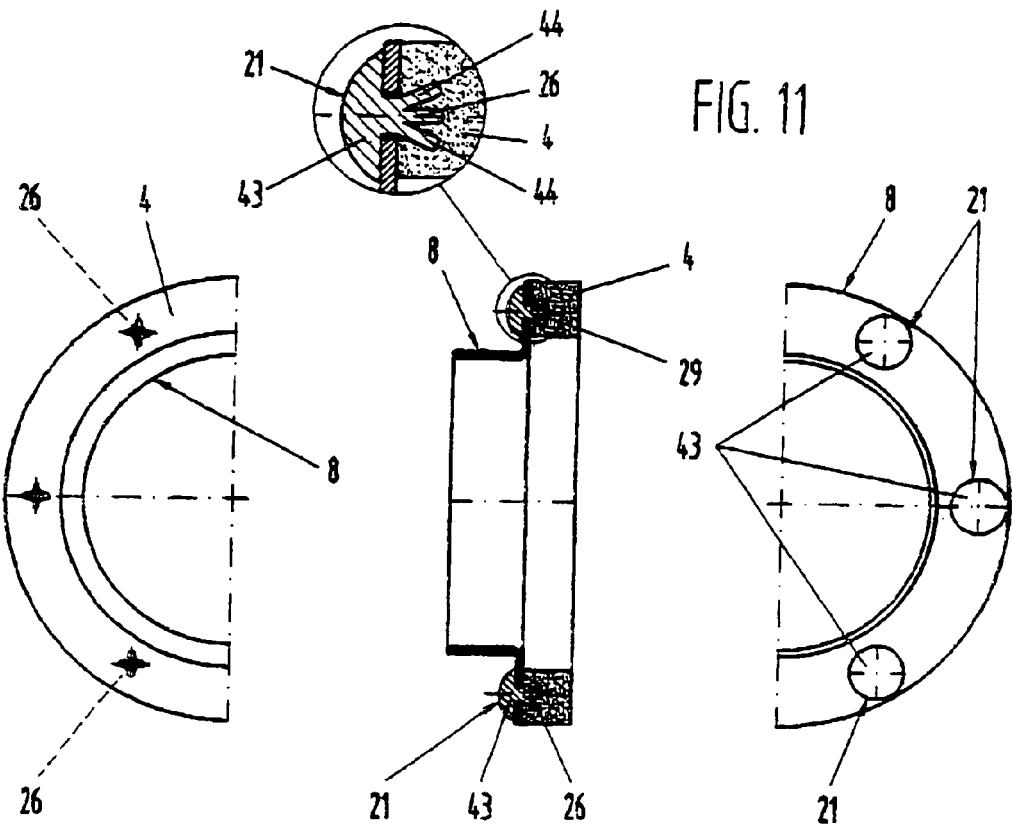
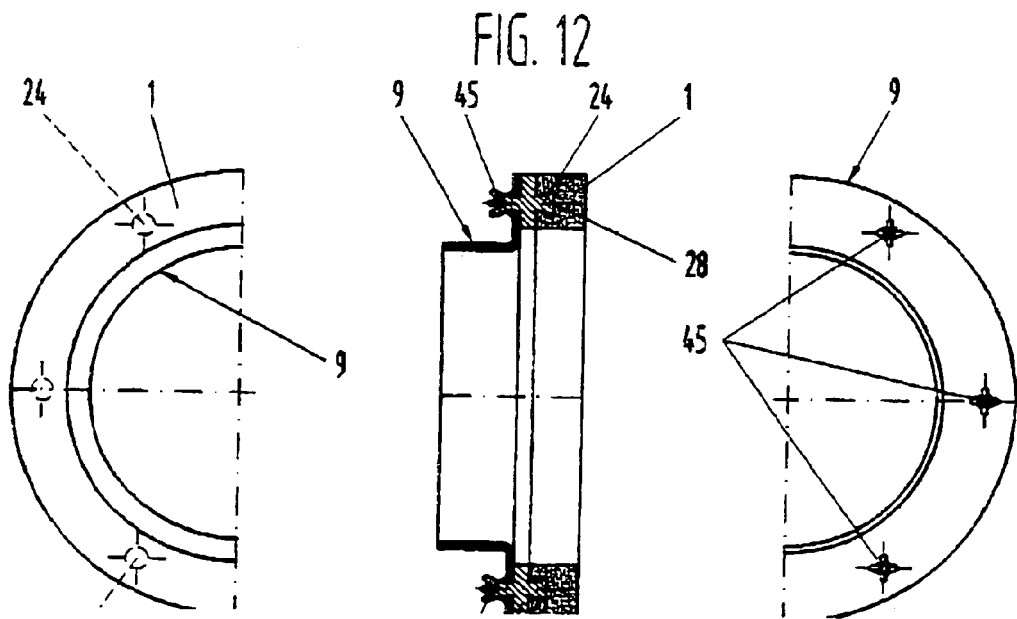

COMPOSITE ARTICLE WITH HIGHLY FILLED PLASTIC COMPONENT

FIELD OF INVENTION

The invention relates to composite articles having a highly filled plastic component which is connected to a basic body.

BACKGROUND AND SUMMARY OF INVENTION

Highly filled plastic components (sometimes referred to below as plastic components with a high filling grade) are components with a material embedded in a plastic matrix. As embedding material, could, for instance, be considered permanent magnetic particles for the manufacture of a plastic bonded permanent magnet, soft magnetic particles the magnetic properties of which are determined by the surrounding electromagnetic fields, ceramic powder e.g. for the manufacture of sealing washers, as well as other powder or particle shaped materials. Such highly filled plastic components are mostly manufactured through injection molding.

As glued joints in many cases do not meet the safety requirements with regard to the fixing of the plastic component, the plastic component is mostly injection molded onto the basic body. With changing thermal conditions, in particular during the cooling of the plastic with a high filling grade after injection molding, contraction strains occur which may lead to cracks at the plastic component in the connecting area. Such cracks may result in the plastic component tearing off the basic body.

This problem, for instance, occurs with plastic bonded permanent magnets which need to be fixed to a shaft as motor magnets or sensor magnets. For this purpose, the basic body to which the plastic bonded permanent magnet is fixed is placed on the captioned shaft by press fitting. The permanent magnets which are applied as motor magnets or sensor magnets are mostly designed as ring magnets or disk magnets being fixed to a likewise ring shaped or bush shaped basic body.

The object of the invention is to create a connection between a plastic component with a high filling grade, e.g. a plastic bonded permanent magnet, and a basic body which avoids the occurrence of cracks in the plastic component under changing thermal conditions.

According to the invention, the object is solved by fixing a plastic component with a high filling grade of the type as described at the beginning not directly onto the basic body, but via at least one intermediary made of elastic material, with the intermediary being in gear with at least one projection in a groove or opening of the plastic component as a frictional and/or positive connection.

Due to the inventive measure, the intermediary absorbs for the most part contraction strains of the plastic with a high filling grade under changing thermal conditions, in particular within the range of its projection or projections, so that cracks in the plastic component can be avoided. The requirements on the intermediate part for the avoidance of cracks can be varied to a great extent in dependence of the design of the plastic component with a high filling grade and the basic body by selection of the geometry of the projections and the elastic material.

The intermediary is preferably made of plastic, the composition and Shore hardness of which is adapted to the physical properties of the plastic component with a high filling grade in order that contraction strains can be absorbed by the projection and/or projections of the intermediary for the avoidance of cracking.

The invention is particularly suitable in case that a highly filled plastic component, e.g. as motor magnet or sensor magnet, is designed as a ring-shaped or disc-shaped component and the intermediary is arranged at least partly at one of its front ends with the projection being embedded in a groove or opening thereat.

In this case, the basic body which can be designed as a metallic carrier body preferably consists of a bush shaped part for fixing the magnet to a shaft and a flange part extending to the outside to which the intermediary or intermediaries are fixed.

The arrangement of the intermediary or intermediaries between the highly filled plastic component and the basic body according to the invention show the further advantage of reducing vibrations which can be passed by the basic body into the highly filled plastic component and by reducing mechanical tensions generated by thermal expansion or forces passed in a non-homogeneous way by providing a thermal or electrical insulation between the basic body and the highly filled plastic component.

The last named advantage particularly applies when the intermediary is designed in ring shape or disk shape, too, and is arranged between the ring shaped flange part of the basic body and the ring shaped or disk shaped plastic component with a high filling grade.

In a special embodiment of the invention, the intermediary is injection molded onto the flange part of the basic body being held by means of butt straps or openings at the flange part. The resulting unit is then inserted into a tool and the plastic with a high filling grade is being injection molded or pressed onto the intermediary.

In another embodiment, the plastic with a high filling grade may first be injection molded or pressed into the intermediary. Afterwards, the intermediary will be fixed to the flange part of the basic body as a frictional or positive connection.

For this purpose, the intermediary may be provided with projections which reach through the openings at the flange part of the basic body thus producing a riveted joint by means of e.g. forming the ends of the projections jutting out of the flange part to a riveted head through ultrasonic or hot stamping.

Further, the intermediary may be provided with projections at its front facing the flange part of the basic body which reach into the openings of the flange part, thus forming a clip joint with the basic body.

In another embodiment, the basic body may be designed in the form of a cylindrical bush with the intermediary showing a bush shaped part which is arranged radially to the basic body as well as an outwardly extending flange part at one front where the plastic component with a high filling grade is fixed.

For fixing purposes, the basic body preferably is provided with radial openings with the elastic material of the intermediary reaching into the openings when injection molded onto the basic body.

Just as well, the basic body can be provided at the side pointing towards the bush shaped part of the intermediary with a circularly running groove or slot into which the elastic material of the intermediary is reaching when injection molded onto the basic body.

Although the invention is particularly suitable for fixing ring shaped or disk shaped plastic components, like e.g. plastic bonded permanent magnets, to an appropriate basic body designed in bush shape, it is applicable for any of the kind of plastic components with a high filling grade which are fixed to a basic body as mentioned in the beginning.

With plastic bonded permanent magnets, it may be the case of isotropic or anisotropic magnets. Such magnets may contain thermoplastic or duroplastic plastics as a binder for the embedded permanent magnetic particles.

The basic body can be designed as one piece. Preferably it consists of metal or plastic.

The basic body can be manufactured as punching-bending part, turn part or in jointing technique.

Preferred embodiments of the invention are further specified in the following based on the drawing.

FIGS. 1 through 14 each show in the center an axial section through the appropriate embodiment, on the left side a front view of the embodiment in the center is seen from the right side, and on the right side a front view of the embodiment shown in the center is seen from the left side; half of each.

The plastic components with a high filling grade 1, 2, 3 and 4 the embodiments of which are shown in FIGS. 1 through 13 are plastic bonded permanent magnets which are connected to a metallic basic body 5, 6, 7, 8, 9, and/or 10 which is pressed into or onto a shaft not shown in the drawing.

As can be further seen from the drawing, the plastic components with a high filling grade 1, 2, 3, and 4 are fixed to the basic body 5, 6. 7, 8, 9, 10 and/or 11 via at least one intermediary 12, 13, 14, 15, 16, 17, 18, 19, 20, 21, 22 and/or 23 made of elastic plastic material, with the intermediary being embedded by a frictional and/or positive connection with at least one projection 24, 25 and/or 26 in a groove 27 or opening 28 and/or 29 of the plastic component with a high filling grade 1, 2, 3 and/or 4.

The intermediaries, in particular their projections, are geometrically designed and the elastic plastic material selected in such a way that with changing thermal conditions no cracks occur at the plastic component with a high filling grade.

The basic body 5 of the unit shown in FIG. 1 is designed as a metallic punching-bending part with a bush shaped part 30 to be fixed at a shaft not shown in the drawing and an outwardly extending flange part 31 to the front of which opposite the bush shaped part 30 a disk shaped intermediary 12 is injection molded. Approximately around its middle, the flange part is provided with butt straps 32 arranged along its circumference which are bent towards the front opposite the bush shaped part. The disk shaped intermediate 12 is connected to the basic body 5 via the butt straps 32.

At the front of the disk shaped intermediary 12 opposite the basic body 5, projections 24 are arranged along its circumference which are shaped in such a way that they show a widening towards their free end.

For manufacturing the entire unit, the component consisting of the basic body 5 and the intermediary 12 is being inserted into a tool and the magnetic material injection molded or pressed on the front of the disk shaped intermediary 12 which shows the projections 24. The plastic component 1 is fixed to the basic body 5 via the intermediary 12 by means of the widening projections 24 reaching into the magnetic material of the plastic component 1.

Together with the plastic component 1, the intermediary 12 forms a cylindrical hollow body, the inside diameter of which is larger than the inside diameter of the bush shaped part 30 of the basic body 5. The outside radius of this part borders in true alignment with the outside radius of the flange part 31 of the basic body 5.

In comparison with the unit shown in FIG. 1, FIG. 2 shows a slightly modified basic body 6, the flange part 31 of which extends radially only over a part of the intermediary 12 and the plastic component 1. The flange part 31 is provided at its foredge with butt straps 32 which are bent towards the front opposite the bush shaped part and by means of which the intermediary 12 is connected to the basic body 6.

FIG. 3 shows an embodiment where the magnetic material of the plastic component 1 is first injection molded on a disk shaped intermediary 13. The positive connection between the plastic component 1 and the intermediary 13 is being achieved by projections 24, as described in the above embodiments, which are injection molded with the magnetic material in such a way that they reach into the plastic component's openings 28 widening towards the inside.

The disk shaped intermediary 13 is provided at the front opposite the plastic component 1 with cylinder shaped bulges reaching through openings 33 in the flange part 31 of the basic body 7 and which are re-shaped to a riveted head 34 through ultrasonic or hot stamping after being connected to the basic body 7. The plastic component 1 is fixed to the basic body 7 via the intermediary by means of these riveted joints.

FIG. 4 shows another possibility of fixing instead of the riveted joint. As in the embodiments according to FIGS. 1 and 2, a disk shaped intermediary 14 was injection molded onto the basic body 7. By means of openings 33 which are arranged along the circumference of the flange part of the basic body 7, the plastic material of the intermediary 14 emerges at the back side of the flange part 31 where it forms a circularly running ring shaped fixing 35. Then the magnetic material of the plastic component 1 was injection molded or pressed onto the disk shaped intermediary 14.

FIGS. 5 through 8 show embodiments where the basic bodies 8, 9, 10 and/or 11 are designed in the form of a cylindrical bush. The intermediaries 15, 16, 17 and/or 18 are provided with a bush shaped part 36 arranged radially towards the basic body with an outwardly extending flange part 37 at its one front to which the plastic component 1 is fixed as described in the above embodiments.

The units as shown in FIGS. 5 through 7 are preferably pressed onto a shaft which is not shown in the drawing, whereas the units shown in FIGS. 6 through 8 are suitable to be fixed in a boring which is not shown in the drawing either.

For the secure connection between the plastic components 1 and the basic bodies 8 and 9 as shown in FIGS. 5 and 6, the basic bodies 8 and 9 are equipped with radial openings 38 into which the plastic material penetrates during injection molding of the intermediaries 15 and 16.

The openings of the embodiments shown in FIGS. 7 and 8 are replaced by circular running grooves 39 at the side of the bush shaped basic bodies 10 and/or 11 pointing towards the intermediaries 17 and 18.

Figure 10:
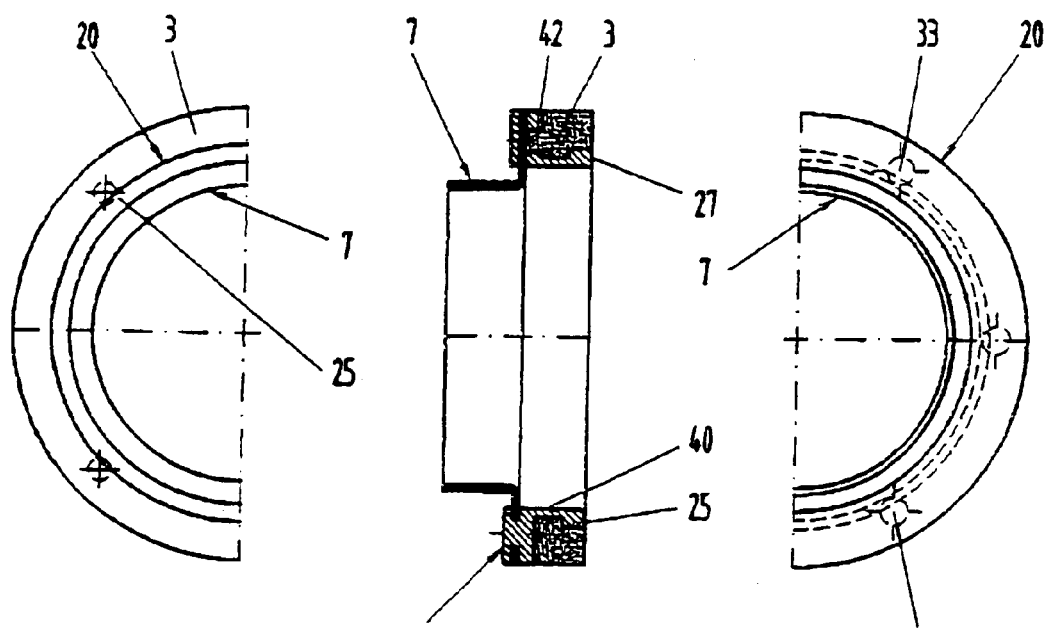

The embodiments shown in FIGS. 9 and 10 show metallic punching-bending parts as basic body 7. Such parts were inserted into a tool together with the plastic components with a high filling grade 2 and/or 3 and the plastic was injection molded around them in a working cycle thus forming the intermediaries 19 and/or 20.

The fixing of the intermediaries 19 and 20 to the basic bodies 7, is done as shown in the embodiment according to FIG. 4. The intermediaries 19 and 20 encompass the plastic component with a high filling grade 2 and/or 3 at the radial inside with a ring shaped area 40 which is provided with a circular running projection 25 pointing to the outside at its end opposite the basic body 7. The projection 25 fixes the plastic component with a high filling grade 2 and/or 3 to the basic body 7.

To support the plastic component with a high filling grade 2 at the basic body, the embodiment as shown in FIG. 9 provides a circular running collar 41 at the radial outside of the plastic component 2.

FIG. 10 shows an embodiment where the support of the plastic component with a high filling grade 3 at the basic body 7 is achieved by means of some bulges 42 distributed along the circumference.

The unit of plastic components with a high filling grade 2 and 3 and intermediaries 19 and/or 20 as shown in FIGS. 9 and 10 is also designed as a ring with rectangular radial cut, the inside diameter of which is larger than the inside diameter of the basic body 7.

FIG. 11 shows the connection of a basic body 8, designed as a punching-bending part, with a plastic component with a high filling grade 4 by means of several intermediaries 21 which are laid out in the form of pins. The pin shaped intermediaries 21 are inserted from the side pointing towards the bush shaped part of the basic body 8 into openings which are distributed along the circumference of the flange part of the basic body. They are adjoining the front of the flange part pointing towards bush shaped part with a dome shaped head 43. At their end opposite the head 43, the pin shaped intermediaries 21 are provided with parts spreading sideways 44 thus serving as projections 26 as a fixing to the plastic component 4. The intermediaries 21 which are laid out as plastic clips were inserted into the borings at the flange part of the basic body 8 before the basic body 8 was inserted in a mold or press. In a following working cycle, the magnetic material of the plastic component 4 was molded or pressed around the projections 26 of the pin shaped intermediaries 21 onto the front opposite the bush shaped part of the flange part of the basic body 8.

FIG. 12 shows an embodiment with a disk shaped intermediary 22 to the front of which where the projections 28 are located the magnetic material of the plastic component 1 was injection molded or pressed. At the opposite front, the intermediary 22 is provided with projections 45 which are distributed along the circumference and serve as a clip joint and which are similarly designed as the projections 26 of the intermediaries 21 shown in FIG. 11. These projections 45 reach through borings appropriately distributed along the circumference in the flange part of the basic body 9.

Figure 13:
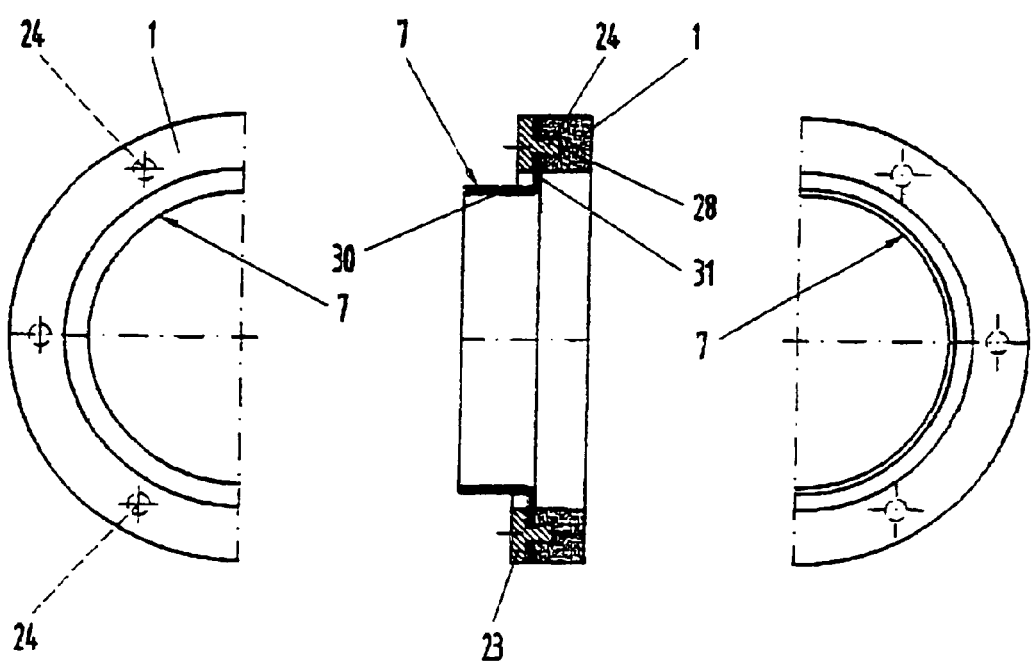

FIG. 13 shows an embodiment where first a disk shaped intermediary 23 was injection molded to the front of the flange part 31 pointing towards the bush shaped part of the basic body 7 in such a way that cylindrical projections 24 with an expanding diameter emerge through the openings 28 which are distributed along the circumference of the flange part 31. Then, in another working cycle, the magnetic material of the plastic component 1 was injection molded or pressed onto the opposite front of the flange part 31.

Figure 14:
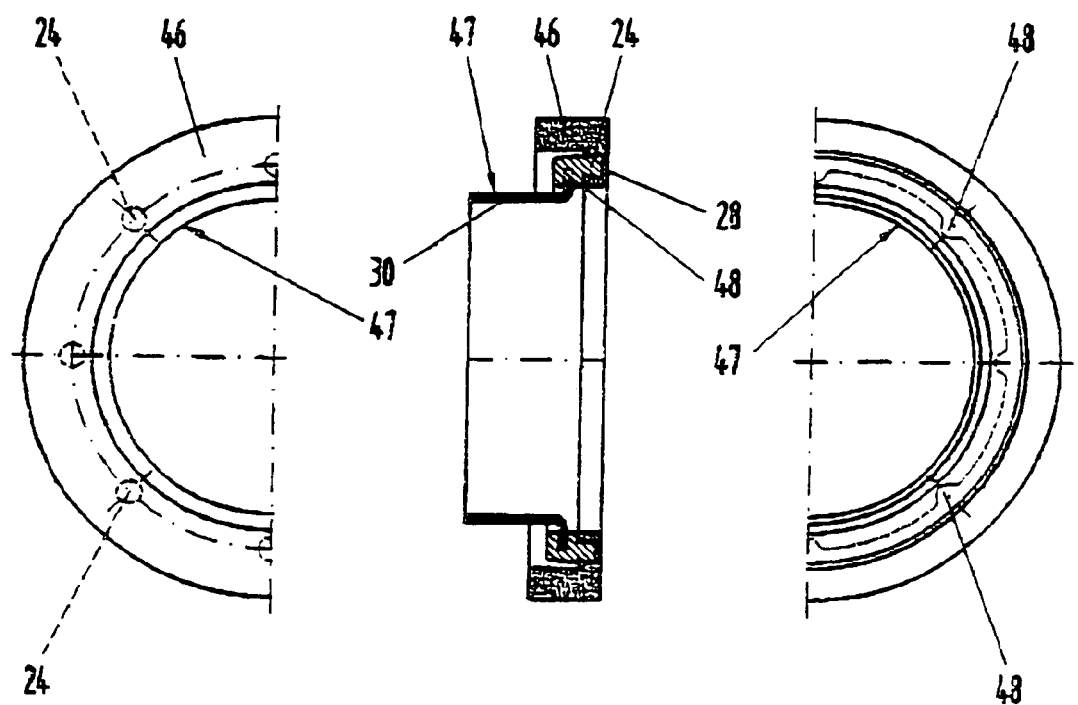

FIG. 14 shows another embodiment with the flange-like part of basic body 47 being injection molded from outside in ring shape with the plastic of the intermediary. The resulting unit is then inserted into a tool and the magnetic material of the plastic component with a high filling grade 46 is injection molded or pressed on. The semicircular reliefs 48 at the outside border of the flange-like part of the basic body 47 serve as a radial torsion protection for the plastic component on the basic body.

What is claimed is:

1. A plastic bonded permanent magnet which comprises:
   a filled plastic component defining a first axial face, wherein said filled plastic component is comprised of a plastic matrix, and permanent magnetic particles as a filler embedded within the plastic matrix in an amount sufficient to render the filled plastic component permanently magnetic;
   a basic body defining a second axial face which is opposed to said first axial face of said filled plastic component; and
   an intermediary component formed of an elastic material which is sandwiched between and indirectly connects said opposed respective first and second axial faces of said filled plastic component and said basic body one to another, wherein
   said intermediary component comprises plural projections extending outwardly therefrom toward said respective first axial face of said filled plastic component, and wherein
   said filled plastic component includes plural recesses formed in said respective first axial face thereof which oppose said plural projections of said intermediary component, and wherein
   each of said projections of said intermediary component is received within an opposed respective one of said recesses of said filled plastic component so as to connect indirectly said opposed respective first and second axial faces of said filled plastic component and basic body one to another by means of frictional and/or positive connection.

2. The plastic bonded permanent magnet according to claim 1, having a ring shape or disk shape, and wherein said intermediary component is at least partly positioned between said opposed respective first and second axial faces of said filled plastic component and said basic body such that each of said projections of said intermediary component extends into and is received by said opposed respective one of said recesses formed in said respective first axial face of said filled plastic component.

3. The plastic bonded permanent magnet according to claim 1, wherein said intermediary component is ring or disk shaped, and wherein the basic body is provided with a bush shaped part for fixing to a shaft, and an outwardly extending flange part to which the intermediary component is fixed.

4. The plastic bonded permanent magnet according to claim 3, wherein the flange part of the basic body includes butt straps or openings for engagement with the intermediary component.

5. The plastic bonded permanent magnet according to claim 3, wherein the intermediary component is fixed to the flange part of the basic body by means of a frictional or positive connection.

6. The plastic bonded permanent magnet according to claim 5, wherein said flange part includes plural openings adjacent said intermediary component, and wherein said intermediary component includes plural stud projections each of which extends through a respective one of openings of the flange part of the basic body, wherein an end of the at least one stud projection is shaped in the form of a rivet head so as to connect said intermediary component to said flange part of said basic body.

7. The plastic bonded permanent magnet according to claim 5, wherein said flange part includes plural openings adjacent said intermediary component, and wherein said intermediary component includes a plurality of spreadable projections each extending towards the flange part through a respective one of the openings thereof so as to thereby form a clip joint to join the intermediary component to the basic body.

8. The plastic bonded permanent magnet according to claim 1, wherein the elastic material of the intermediary component is injection molded around the filled plastic component and the basic body.

9. The plastic bonded permanent magnet according to claim 1, wherein said basic body is provided with a bush shaped part for fixing to a shaft, and an outwardly extending flange part, and wherein the intermediary component includes several pin-shaped intermediaries which are distributed along a circumference of the flange part thereby forming a clip joint therewith, wherein the filled plastic component is injection molded or pressed onto said pin-shaped intermediaries.

10. The plastic bonded permanent magnet according to claim 1, wherein the basic body is in the shape of a cylindrical bush, and wherein the intermediary component is provided with a bush shaped part which is arranged radially with respect to the basic body and an outwardly extending flange part at a front thereof onto which the filled plastic component is fixed.

11. The plastic bonded permanent magnet according to claim 10, wherein the basic body is provided with radial openings and wherein the each of the projections of the intermediary component extends into a respective one of the radial openings.

12. The plastic bonded permanent magnet according to claim 1, wherein the basic body is made of metal.

13. The plastic bonded permanent magnet according to claim 1, wherein the basic body is made of a plastics material.

14. The plastic bonded permanent magnet of claim 1, wherein said intermediary component is sandwiched between said respective opposed first and second axial faces of said filled plastic component and said basic body.

15. The plastic bonded permanent magnet of claim 1, wherein each of said projections received within said opposed respective one of said recesses establishes a frictional or positive connection therebetween.

16. The plastic bonded permanent magnet of claim 6, wherein said rivet head is formed by means of ultrasonic or hot stamping.

17. A composite permanent magnetic article comprising:
a filled plastic component having permanent magnetic particles as a filler material embedded within a plastic matrix;
a basic body; and
an intermediary component formed of an elastic material which is positioned coaxially between, and indirectly connects, opposed axial faces of said filled plastic component and said basic body, wherein
one side of said intermediary component is connected to said respective axial face of said basic body, and wherein another side of said intermediary component is connected to said respective axial face of said filled plastic component by means of plural projections formed on said another side of said intermediary component and plural recesses formed in said respective axial face of said filled plastic component in opposition to respective ones of said plural projections, wherein said each of said plural recesses receives an opposed respective one of said plural projections so as to connect said intermediary component thereto.

18. The composite article of claim 17, wherein each of said filled plastic component, basic body and intermediary component is ring-shaped.

19. The composite article of claim 18, wherein said basic body includes a bush-shaped part for connection to a shaft, and an outwardly extending flange part.

20. The composite article of claim 19, wherein said flange part includes circumferentially disposed openings, and wherein said one side of said intermediary component is connected to said flange part by means of spreadable clip projections extending outwardly from said one side of said intermediary component and through respective ones of said circumferentially disposed openings of said flange part.

21. The composite article of claim 19, wherein said flange part includes circumferentially disposed openings, and wherein said one side of said intermediary component is connected to said flange part by means of stud projections extending outwardly from said one side of said intermediary component and through respective ones of said circumferentially disposed openings of said flange part, wherein ends of said stud projections are shaped in the form of a rivet head.

* * * * *